Sept. 1, 1953 — E. MATHIESEN — 2,650,427

MILK COOLING AND DISTRIBUTING MEANS

Filed Feb. 7, 1950 — 2 Sheets-Sheet 1

INVENTOR.
Erik Mathiesen.
BY Flocks and Simon
ATTORNEYS.

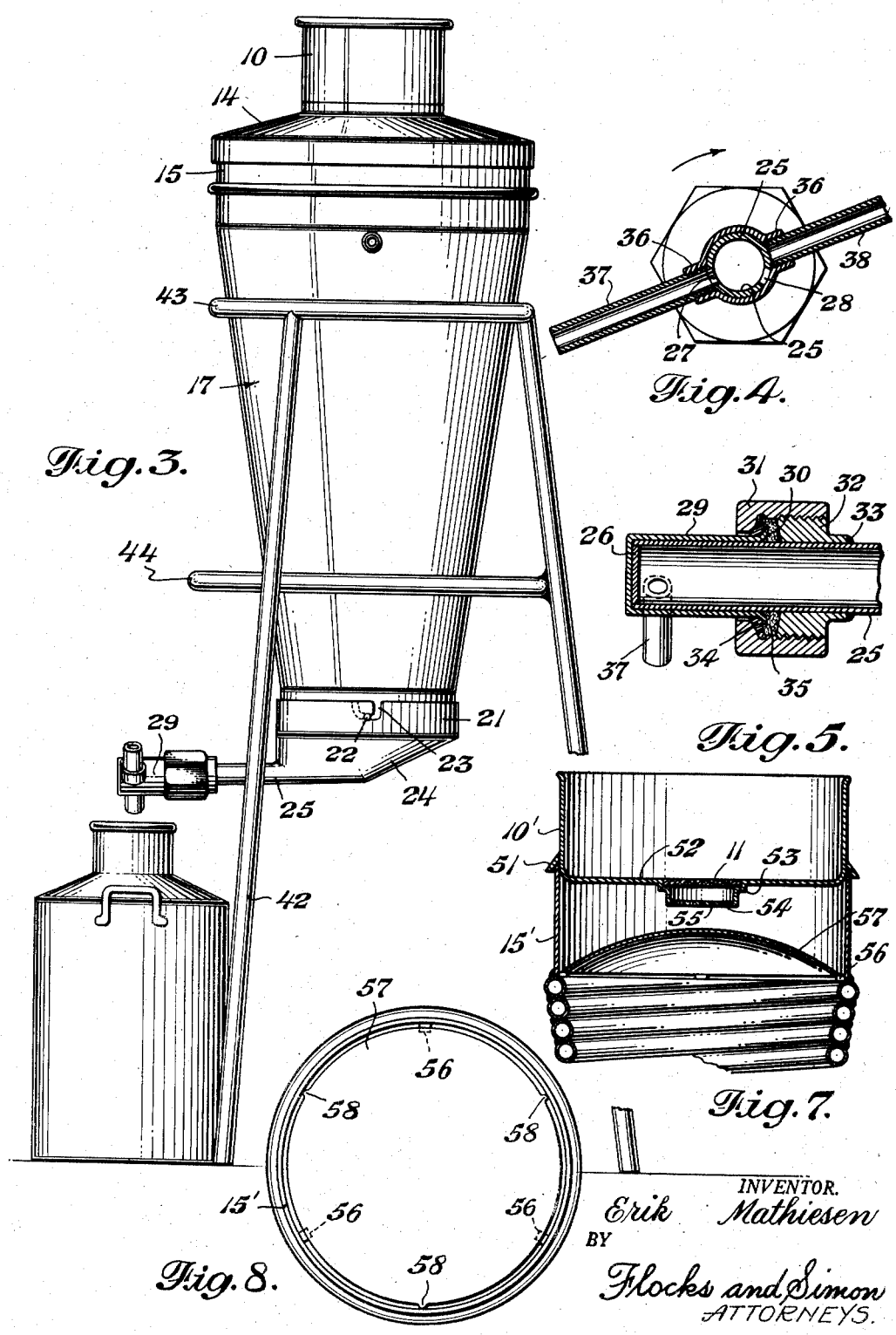

Patented Sept. 1, 1953

2,650,427

UNITED STATES PATENT OFFICE 2,650,427

MILK COOLING AND DISTRIBUTING MEANS

Erik Mathiesen, Lyons, Nebr.

Application February 7, 1950, Serial No. 142,826

4 Claims. (Cl. 31—4)

This invention relates to a device for cooling liquids and more particularly to a device which permits the continuous cooling and straining of milk.

It is an object of the present invention to provide a more economically constructed liquid cooling device than those now in use.

Another object of the present invention is to provide a device which strains the milk as well as cools it so that the necessary filtration can be effected simultaneously with the cooling immediately after milking.

A further object of the present invention is to provide a device for cooling milk which is comprised of a plurality of relatively small parts which can be readily assembled together for use and readily disassembled for cleaning and sterilizing.

It is a still further object of the invention to provide a liquid cooler with an outlet so constructed that the milk receptacle can be changed while the milk is running without waste or spillage.

It is a still further object of the invention to provide a device for continuously cooling and straining milk with means for tilting the outlet therefrom from one milk receiver to another without spilling.

Other objects and the nature and advantages of the instant invention will be apparent from the following description taken in conjunction with the accompanying drawings, wherein:

Fig. 3 is a side elevation of the device;

Figs. 4 and 5 are details on a larger scale of the outlet arrangement;

Fig. 7 is a detail sectional view of a modified form of the straining vessel and distributor, and Fig. 8 is a top plan view of the distributor of Fig. 7 with the straining vessel removed.

Figure 1:
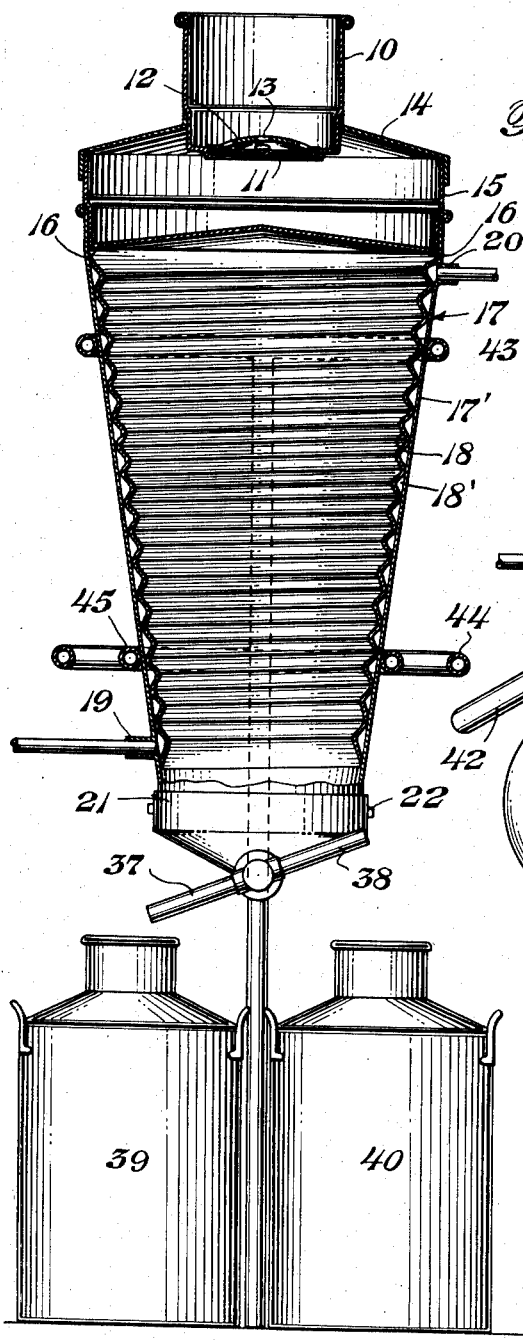
Fig. 1 is a vertical sectional view of the device.
Figure 2:
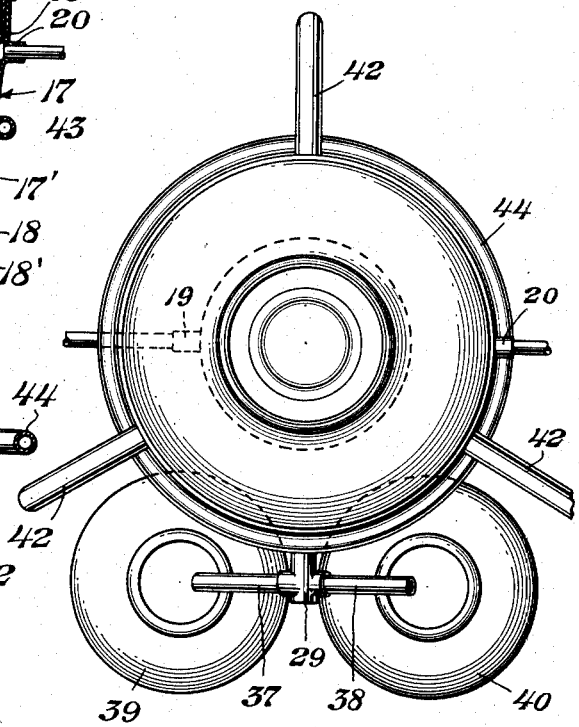
Fig. 2 is a top plan view of the device.

In the drawings the numeral 10 designates a straining vessel whose bottom portion is reduced in diameter in two steps toward a circular opening in the center. On the lower step thus formed which surrounds the circular opening rests a detachable filter element 11. The filter element is kept in position by a heavy straining plate 12 which is provided with holes 13 therein for passage of the milk.

The filter element 11 may be a wire screen supporting a disc of cotton wool, filter paper or other filtering means. The straining vessel 10 rests on the attachment 14 which in turn covers a distributor 15. The bottom of the distributor 15 is conical in shape reaching a peak at the center thereof. At the circumference of the bottom portion are a plurality of outwardly sloping holes 16. The distributor 15 fits into the top of a cooling jacket 17 shaped as an inverted truncated cone. The cooling jacket 17 comprises an outer smooth wall 17' and a corrugated inner wall 18. The space between the outer and inner walls forms a spiral passageway 18' through which a cooling agent flows from an inlet 19 at the bottom thereof for the entering cooling agent to an outlet 20 at the top thereof. The corrugated inner wall 18 results in an increased cooling surface over which the liquid to be cooled flows downwardly in heat interchange with the cooling agent within the passage 18'.

A trough 21 is supported at the lower end of the cooling jacket 17 by means of pins 22 extending outwardly from the jacket. The pins fit into bayonet slots 23 in the trough 21. The slots are L-shaped so that the trough is supported by inserting the pins into the slots by a vertical movement upward of the trough followed by a twisting movement of the trough with respect to the jacket. The lower end of the trough 21 is provided with sloping side walls 24. An outlet conduit 25 leads from the lower end of the trough 21 horizontally therefrom. The end of conduit 25 is closed by means of a disc 26 secured therein. A pair of holes 27, 28 are provided on the lower side of the conduit 25 near the disc 26. Surrounding the conduit 25 at its outer end is a sleeve 29 which is closed at its outer end so as to completely enclose the outer end of the conduit 25 and the holes 27, 28 therein. The inner end of the sleeve 29 is flanged outwardly at 30, and the flange 30 is retained between a nipple 31 and a sleeve 32 which is attached to the conduit 25 at 33 by means of solder or the like. The nipple 31 is internally threaded at one end so as to engage external threads on the sleeve 32. A gasket 34 is provided between the flange 30 and the nipple 31, and packing material 35 is placed between the flange 30 and the sleeve 32. The sleeve 29 is thus rotatably mounted about the end of conduit 25, the flange 30 rotating between the gasket 34 and the packing 35. Near the outer end of sleeve 29 at a point corresponding to the location of the holes 27 and 28 in conduit 25 are a pair of bosses 36 which are internally threaded to receive pipes 37 and 38. The bosses 36 are so arranged about the circumference of the sleeve 29 that only one of the holes 27, 28 can be aligned at once with the hole through one of the bosses 36 and the pipe 37 or 38. As indicated in Fig. 4, the hole 27 is in alignment with pipe 37. By rotating the sleeve 29 with respect to the conduit 25 in the direction indicated by the arrow in Fig. 4, pipe 38 can be brought into alignment with the hole 28. In this manner, the liquid cooled in flowing downwardly over the cooling jacket flows into the trough 21, through outlet conduit 25, hole 27, and pipe 37 into the receptacle 39 located immediately below the end of pipe 37, as shown in Fig. 1. When receptacle 39 has been filled, the sleeve 29 is rotated approximately 45° clockwise and the flow of cooled liquid is immediately diverted through hole 28 and pipe 38 to a second receptacle 40 without spillage. The receptacle 39 can be replaced by an empty receptacle so that when receptacle 40 has been filled, the sleeve 29 can be rotated approximately 45° counterclockwise to start filling the empty receptacle. Stops can be provided to limit the extent of rotation of sleeve 29 to approximately 45° so that at the end of its travel in either direction the pipes are in alignment with the outlet holes.

The entire cooler described above is supported on a stand 41 which comprises a plurality of legs 42 attached at their upper ends to a ring 43 and at an intermediate point thereon to a ring 44 which supports a ring 45 concentrically thereto of smaller diameter. The diameters of the rings 43 and 45 are such as to fit around the outer diameter of the cooling jacket 17 at two spaced points thereon and thus support the entire assembly.

Figure 6:
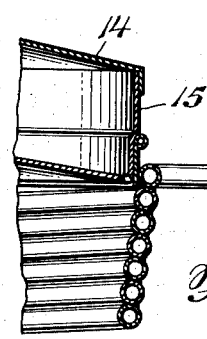
Fig. 6 is a detail sectional view of a modified arrangement of cooling jacket.

Instead of the corrugated inner wall 18 of the cooling jacket 17, the cooling jacket can be constructed, as shown in Fig. 6, from a long piece of ductile metal tubing which is coiled into the frusto conical shape with successive turns soldered together. The cooling water would be admitted into the coil at the bottom thereof and cool the liquid flowing downwardly from the distributor 15 on the outside inner surface of the coil.

In the operation of the apparatus, the several parts of the device may be readily disassembled for cleaning and sterilization. In reassembling the device, the cooling jacket 17 is first inserted through the rings 43 and 45 of the stand 41. The distributor 15 is placed into the top of the jacket 17, and the strainer assembly is supported on the distributor. The trough 21 is mounted onto the lower end of the cooling jacket so that the pins 24 on the jacket engage the slots 23 in the trough and thus support it. Receptacles 39 and 40 are placed below the outlet pipes in the trough, and cooling water is connected to the inlet therefor at the lower end of the cooling jacket. The liquid to be cooled and filtered is poured into the strainer 10 at the top of the cooler. The liquid flows through the filter therein and down the distributor 15 to the periphery thereof. The liquid flows through the holes 16 arranged about the periphery of the distributor, and the liquid is thus distributed evenly around the inner circumference of the cooling jacket. The liquid flows downwardly over the corrugated surface 18 and is cooled by heat exchange with the cooling liquid flowing through the passageway 18' in the jacket. The liquid is collected in the trough 21 and flows through the outlet conduit 25 to one of the outlet pipes 37 or 38 as previously described. The flow may be quickly and cleanly switched from outlet pipe 37 to outlet pipe 38 by merely rotating or tilting the sleeve 29 and outlet pipes 37, 38 which are integral therewith through an angle of approximately 45°.

A modified form of the straining vessel and distributor is shown in Figs. 7 and 8. The straining vessel 10' is of slightly smaller diameter than the distributor 15', and is supported thereby. The straining vessel 10' is cylindrical in shape and is provided with a flange 51 near the bottom thereof on its outer surface, which engages the top of the distributor 15'. The bottom 52 of the straining vessel is provided near the center thereof with an indented shoulder 53 on which the filter element 11 is supported, and a small strainer cup 54 at the center thereof. The strainer cup 54 is provided with a plurality of holes 55 through which the milk flows after passing through the filter element 11. The distributor 15' is composed of a cylindrical tube provided with a plurality of small supports 56 at the bottom of the tube extending inwardly therefrom to act as the supporting means for a round concave plate 57. The milk flowing downwardly through the strainer cup 54 falls onto the plate 57 and is directed outwardly to the inside diameter of the cooling coil. The plate 57 may be provided with a plurality of small extensions 58 to aid in properly centering the plate. As shown in Fig. 7, the distributor 15' may be permanently attached to the upper end of the cooling coil, or if desired it may merely be supported thereon.

The entire assembly may be economically manufactured and permits a continuous cooling and filtering of milk without the necessity for shutting off the flow while changing milk receptacles into which the cool filtered milk is packaged. The assembly has been found to cool milk down to the temperature of the cooling water, approximately 50° F. in ten to fifteen seconds, thus decreasing the bacteria growth since bacteria can not increase at a temperature of approximately 50° F. or below.

It will be obvious to those skilled in the art that various changes may be made without departing from the spirit of the invention and therefore the invention is not limited to what is shown in the drawings and described in the specification but only as indicated in the appended claims.

I claim:

1. In a liquid cooler the combination with a conical cooling jacket, means engaging said jacket near the bottom thereof for cooling the walls thereof, a distributor comprising a cylindrical tube supported by the cooling jacket, a plurality of small supports extending inwardly from the lower end of the cylindrical tube, a concave round plate resting on the supports of slightly less diameter than the tube so as to direct the liquid to be cooled outwardly to the inside wall of the cooling jacket, a separable strainer supported by the distributor, a separable collecting means supported by the cooling jacket at the lower end thereof, said collecting means having slots formed therein, pins secured to said jacket and engaging said slots for securing said collecting means to said jacket, and outlet means leading from said collecting means which can be tilted from one position to a second position for alternately directing the flow of cooled liquid into one of a plurality of receptacles thereunder, said outlet means comprising a fixed conduit, and a sleeve provided with pipes threaded therein, said sleeve rotatably secured on said fixed conduit.

2. A liquid cooler as described in claim 1 in which the conical cooling jacket is formed of metal tubing coiled into the frusto conical shape with successive turns secured together.

3. A liquid cooler comprising a conical double walled cooling jacket, means engaging said jacket near the bottom thereof for cooling the walls thereof, a distributor supported by the cooling jacket and separable therefrom provided with means for directing the liquid to be cooled against said cooling wall, a strainer supported by the distributor and separable therefrom, a collecting means supported by the cooling jacket at the lower end thereof and separable therefrom, said collecting means having slots formed therein, pins secured to said jacket and engaging said slots for securing said collecting means to said jacket, outlet means leading from said collecting means which can be tilted from one position to a second position for alternately directing the flow of cooled liquid from the collecting means to one of two receptacles located thereunder, said outlet means comprising a fixed conduit, and a sleeve provided with pipes threaded therein, said sleeve rotatably secured on said fixed conduit, and a supporting stand mounted on legs for supporting the cooling jacket above the said receptacles.

4. A device for supplying liquid to a plurality of receptacles, comprising a first sleeve provided with a flange and having a pair of pipes threaded therein adjacent one end thereof, said first sleeve secured to a liquid directing means by a nipple and a second sleeve, said nipple rotatably engaging said flange and being internally threaded, said second sleeve fixedly engaging the directing means and being externally threaded so as to engage the internal threads of said nipple, and means located between said nipple and said second sleeve for preventing leakage between said first sleeve and said directing means, said directing means having a pair of holes provided in the side wall adjacent the end thereof, said holes cooperating with the pipes as the first sleeve is rotated so as to emit liquid through the desired pipe into a receptacle.

ERIK MATHIESEN.

References Cited in the file of this patent

UNITED STATES PATENTS

| Number | Name | Date |
| --- | --- | --- |
| 192,728 | Bailey | July 3, 1877 |
| 200,383 | Fischer | Feb. 19, 1878 |
| 915,459 | Minns | Mar. 16, 1909 |
| 1,081,982 | Patton | Dec. 23, 1913 |
| 1,114,964 | Christensen | Oct. 27, 1914 |
| 1,273,404 | Petersen | July 23, 1918 |
| 1,692,760 | Oritz | Nov. 20, 1928 |
| 1,768,916 | Lancaster | July 1, 1930 |
| 1,950,682 | Malsbary | Mar. 13, 1934 |
| 2,166,245 | Goff et al. | July 18, 1939 |

FOREIGN PATENTS

| Number | Country | Date |
| --- | --- | --- |
| 19,256 | Sweden | Apr. 2, 1904 |
| 650,049 | France | Sept. 11, 1928 |
| 307,951 | Great Britain | 1929 |